Sept. 4, 1934.    H. FRIEDMAN ET AL    1,972,768
ATMOSPHERIC PRESSURE OPERATED LOCKING MECHANISM
Filed May 18, 1933

INVENTORS
Harry Friedman
Carl Hochmuth
By Albert F. Dieterich
ATTORNEY.

Patented Sept. 4, 1934

1,972,768

UNITED STATES PATENT OFFICE 1,972,768

ATMOSPHERIC PRESSURE OPERATED LOCKING MECHANISM

Harry Friedman and Carl Hochmuth, Vancouver, British Columbia, Canada

Application May 18, 1933, Serial No. 671,728
In Canada January 26, 1933

3 Claims. (Cl. 70—127)

This invention relates to an atmospheric pressure locking system for application to automobiles and like vehicles whereby the car and its accessories are rendered immune to pilfering and stealing and tampering with its engine.

The present application is for improvements on our Patent No. 1,923,817 issued August 22, 1933, and has for one of its objects means for rendering the locking mechanism inoperative through the hand cranking or manual operation of the engine.

The vacuum line is provided with a branch leading to the ignition lock which, when open to shut off the ignition circuit, opens the end of the vacuum line branch, thereby preventing the building up of a vacuum in the line to cause the atmospheric pressure to operate the locks, but the moment the ignition circuit is closed by turning the key in the ignition lock such movement of the lock or key barrel closes the vacuum line.

Our invention will be more readily understood by reference to the specification and drawing accompanying and forming part of this application, in which.

Figure 1:
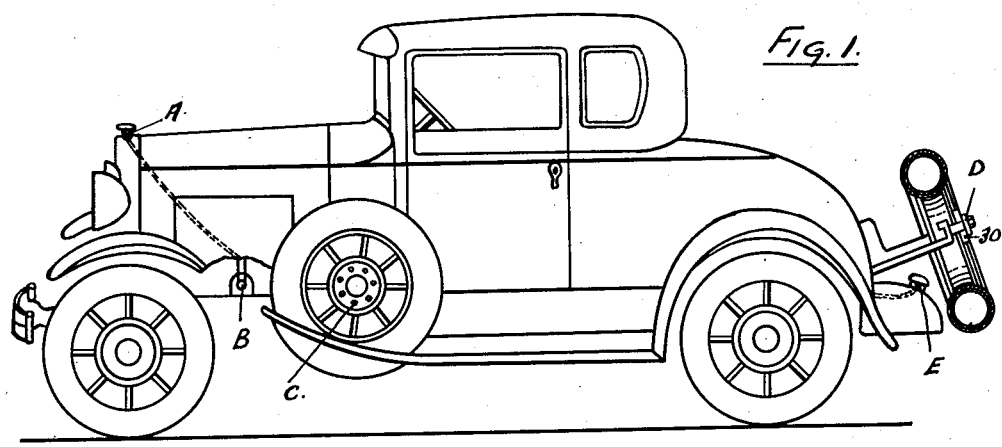
Figure 1 is a composite view of an automobile showing where the locks may be applied on a car to the radiator ornament, engine hood, spare tire at the rear of the car, gasoline tank cap and spare wheel at the side of the car.
Figure 2:
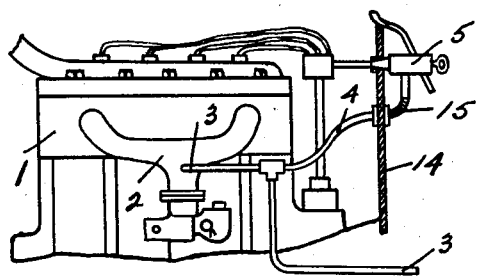
Figure 2 is a diagrammatic view of the motor showing the vacuum line connection to the intake manifold and branch from the vacuum line connected to the ignition switch by which the vacuum may be broken through operation of the switch key.

In the drawing like numerals indicate like parts throughout irrespective of the shape or form of the parts and the numeral 1 indicates a motor of an automobile, 2 the intake manifold thereto to which is attached the duct 3 having a branch 4 connected to the ignition switch 5 of the automobile.

The terminal connection of the branch 4 to the ignition switch 9 houses a valve 6 having a spring 7 by which it is seated upon the seat 8 when not engaged by the plunger 9.

Figure 3:
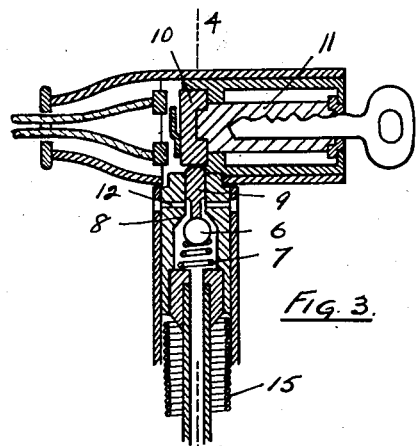
Figure 3 is a sectional view of the ignition switch lock connected to a valve mechanism used for making and breaking the vacuum in the vacuum line connecting the lock mechanisms.
Figure 4:
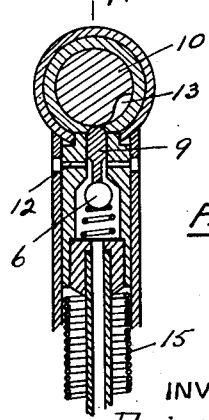
Figure 4 is an end sectional view of the ignition switch taken on the line 4—4 of Figure 3 and shows the cam on the end of the key barrel in contact with the plunger of the valve displacing the ball off its seat thereby opening the valve and connected vacuum line to the atmosphere.

The plunger 9 is in engagement with the cam 10 secured upon the end of the key barrel 11 of the ignition switch 5 and when the key barrel is turned to the "off" position, as shown in Figures 3 and 4, the plunger 9 is depressed and removes the ball valve 6 from its seat 8 and opens the valve and its connected branch to the atmosphere through the passage 13 formed in the valve body.

When the key barrel is turned to the "on" position the ball valve 6 is seated upon its seat 8 under the action of the spring 7 by reason of the plunger 9 registering with the recess 13 cut into the face of the cam 10 that permits the valve to seat.

The branch 4, after it passes through the dash board 14 is encased in a section of heavily armoured cable 15 to prevent the branch being cut in the event that unauthorized parties have succeeded in obtaining entry to the car, in which event it would be possible to establish a partial vacuum in the duct 3 by manual operation of the engine after the branch is cut.

The duct 3 and branch 4 are usually of soft copper tubing that can be easily punctured, hence the necessity in protecting it in exposed positions.

The duct 3 is extended and secured to the chassis frame of an automobile in any convenient manner and has branches connected thereto leading to atmospheric pressure operated locking mechanisms positioned in and about the automobile.

Figure 1, which is a composite view of an automobile, illustrates where it is possible and desirable to position and affix such mechanisms and in this figure a locking mechanism is indicated at A as secured to the radiator cap to prevent its removal as a valuable ornament may be secured thereto. Another locking mechanism is shown attached to the engine hood at B to prevent it being opened when the engine is stopped and the car parked. A bolt lock, is indicated at C as being used on the spare wheel to secure it to its carrying standard. Another lock, is indicated at D as being used to secure a spare tire and rim to its carrying standard at the rear of the car, while E indicates another lock, used on the filling neck of the gasoline tank to secure thereupon the cap 16 to prevent theft of the gasoline by siphoning and removal of the cap.

It will be noted from the above description of the salient features of our invention that when a car is fitted with the locks described that all the locks are in operative position when the engine is stopped and the car parked; when the ignition switch is shut off the vacuum duct 3 is open to the atmosphere, therefore the locks cannot be acted upon through manual operation or hand cranking of the engine as it is impossible to build up a vacuum in the duct 3 to effect the atmospheric pressure operation of the locks while the switch is open, and that when the switch is closed and the engine operating the locks are all in the open or inoperative position and all parts of the car to which the locks are applied are free.

Having now described our invention what we claim and desire to be protected in by Letters Patent, is:

1. In an atmospheric pressure locking system for detachable parts of an automobile, a suction duct, a source of suction to which said duct is connected, atmospheric pressure operated suction effected locks for said detachable parts and connected with said duct, an ignition switch for the automobile engine and a valve device cooperating with said switch for connecting said duct with atmosphere to prevent action of atmospheric pressure on said locks when the switch is in the "off" position.

2. In an atmospheric pressure locking system for detachable parts of an automobile, a suction duct, a source of suction to which said duct is connected, atmospheric pressure operated suction effected locks for said detachable parts and connected with said duct, an ignition switch for the automobile engine and a valve device cooperating with said switch for connecting said duct with atmosphere to prevent action of atmospheric pressure on said locks when the switch is in the "off" position, said valve device comprising a body having a passage with a valve seat, means connecting said duct with said body at one side of said seat, said body having ports communicating with the atmosphere at the other side of said valve seat, a valve, means continuously tending to seat said valve, and means actuated by the turning of said ignition lock to the "off" position for unseating said valve.

3. In an atmospheric pressure locking system for detachable parts of an automobile, a suction duct, a source of suction to which said duct is connected, atmospheric pressure operated suction effected locks for said detachable parts and connected with said duct, an ignition switch for the automobile engine and a valve device cooperating with said switch for connecting said duct with atmosphere to prevent action of atmospheric pressure on said locks when the switch is in the "off" position, said valve device comprising a body having a passage with a valve seat, means connecting said duct with said body at one side of said seat, said body having ports communicating with the atmosphere at the other side of said valve seat, a valve, means continuously tending to seat said valve, and means actuated by the turning of said ignition lock to the "off" position for unseating said valve, said valve comprising a ball, a plunger in said body for engaging said ball and a cam cooperating with said ignition lock and said ball for unseating said ball when said lock is turned to the "off" position.

HARRY FRIEDMAN.
CARL HOCHMUTH.